Patented June 23, 1931

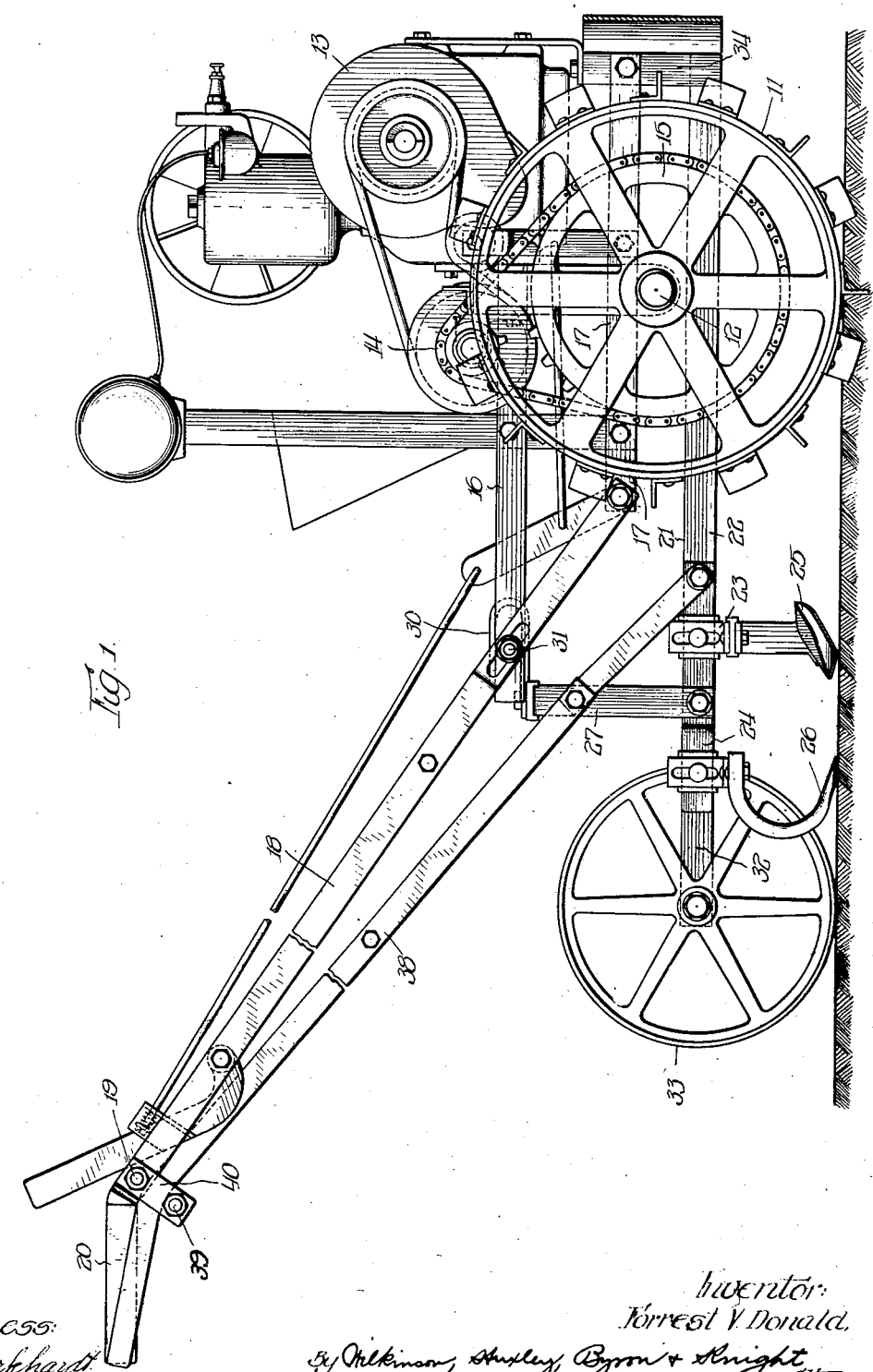

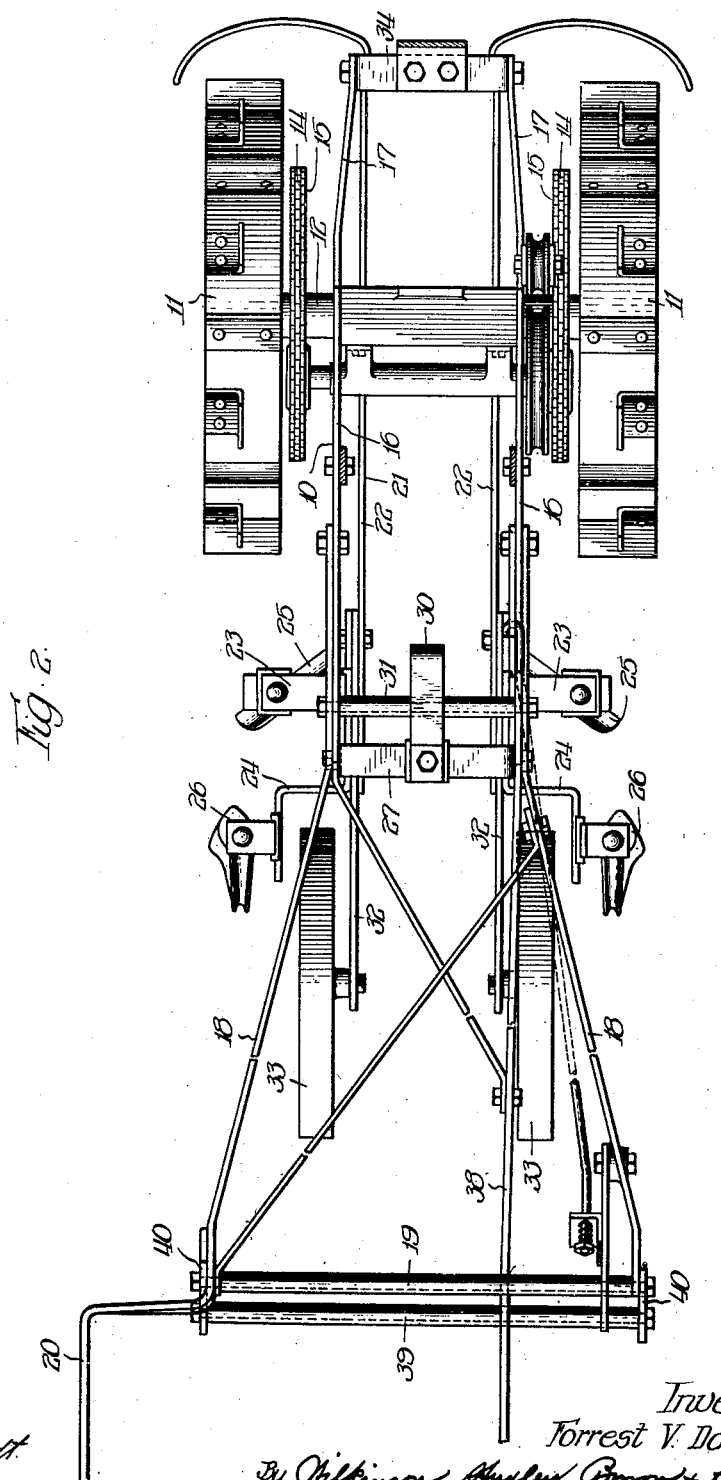

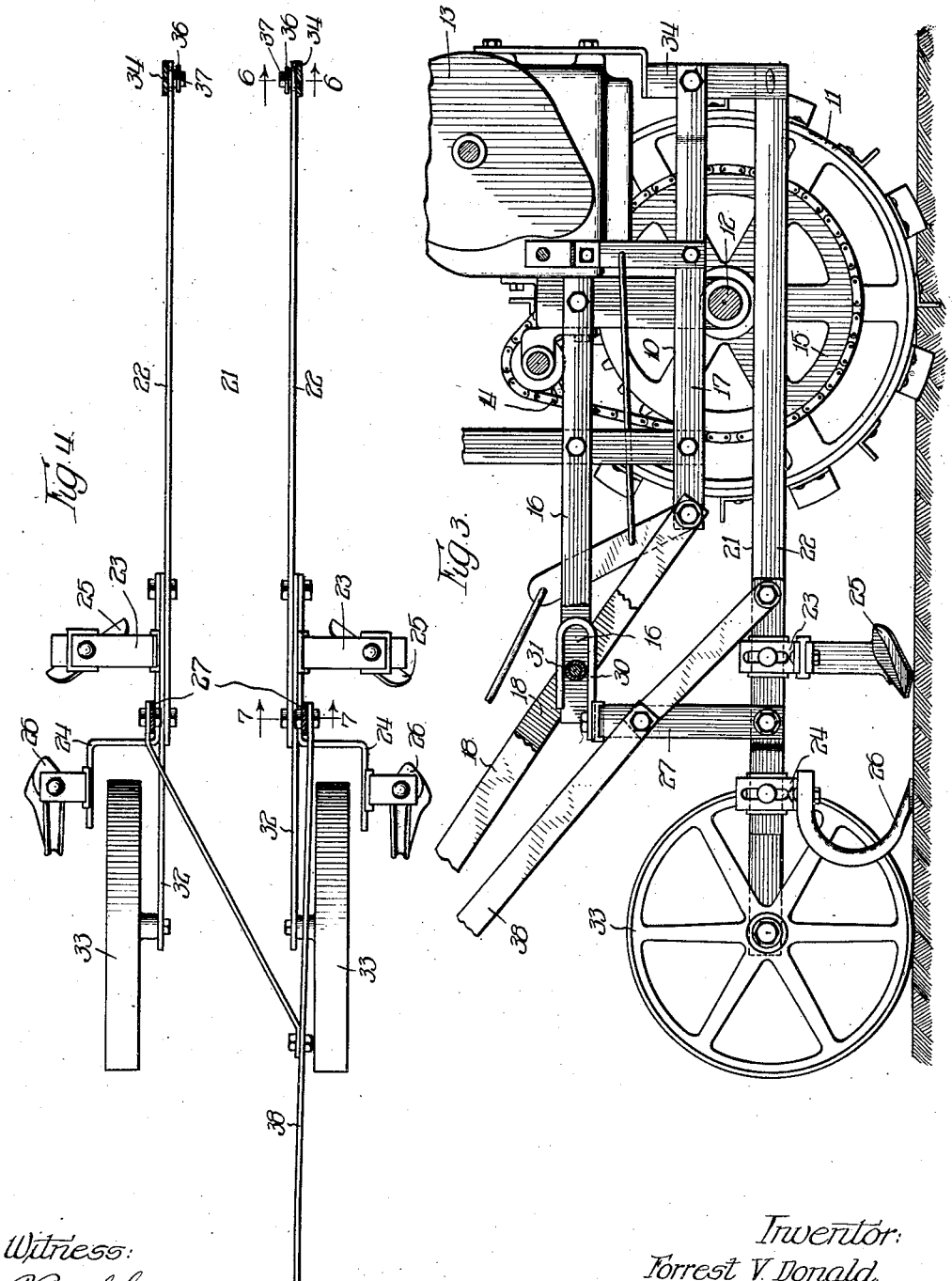

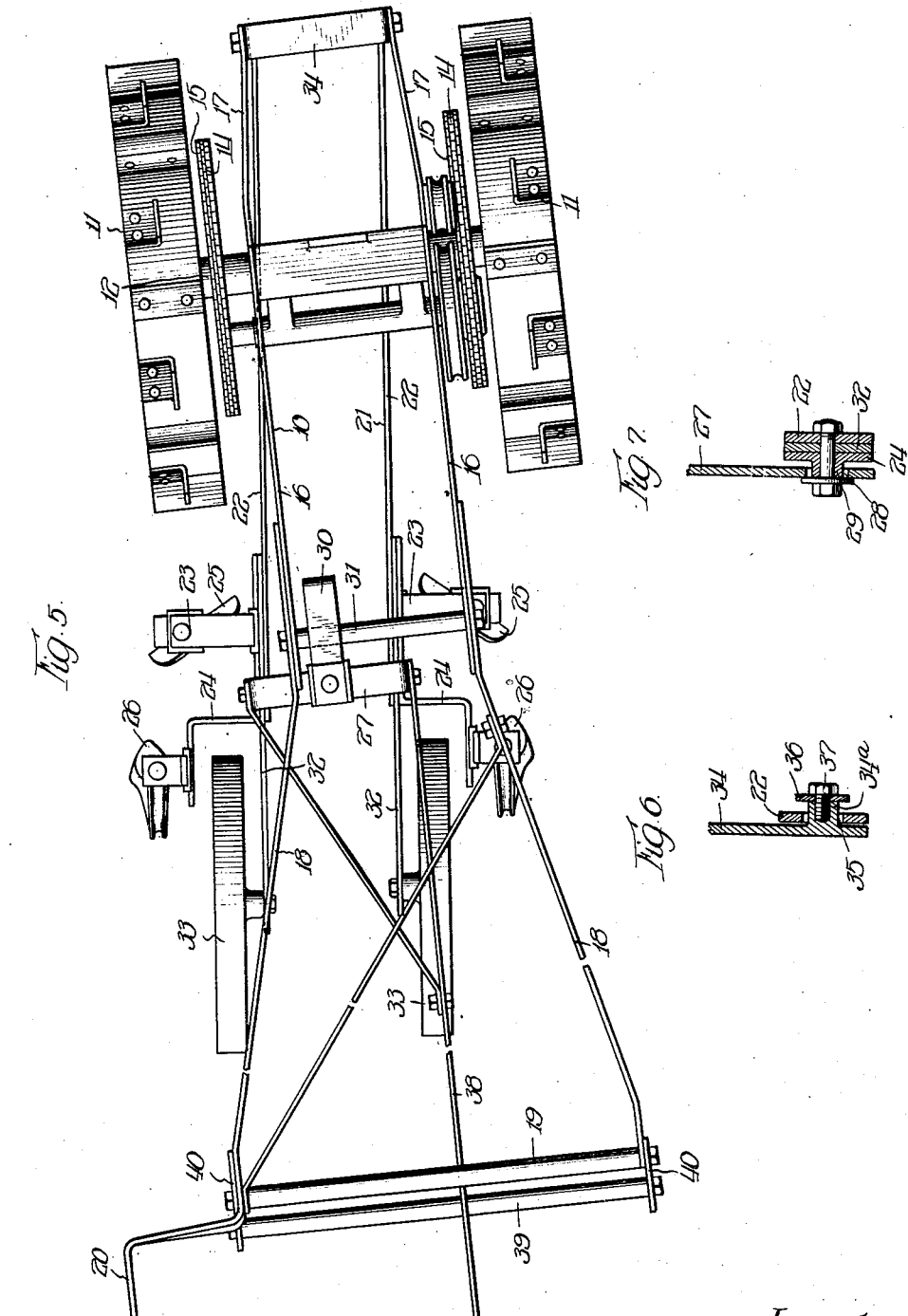

1,811,175

UNITED STATES PATENT OFFICE

FORREST V. DONALD, OF MINNEAPOLIS, MINNESOTA, ASSIGNOR TO GILSON MANUFACTURING COMPANY, OF PORT WASHINGTON, WISCONSIN, A CORPORATION OF WISCONSIN

GROUND CULTIVATING MACHINE

Application filed September 9, 1921. Serial No. 499,432.

This invention relates to propelled ground working devices such as tractor cultivators and the like.

In power propelled and horse drawn ground working devices, such as cultivators and the like, thus far used, the main wheel supported frame is guided by suitable steering mechanism and in addition thereto other means is provided for guiding the ground working tools which are attached to the frame, or the ground working tools are so connected to the main wheeled frame that when said main wheeled frame is turned in one direction, ultimately to cause the ground working tools to move slightly away from a row of vegetation, said tools move in the opposite direction or closer to, and in many instances cut into, such row of vegetation, resulting in considerable damage or destruction of plants.

The object of this invention is to provide a simple and efficient propelled ground working device in which the tools are accurately and easily controlled to prevent damage to rows of vegetation being cultivated or otherwise treated, the cooperating parts of the mechanism being arranged to meet all of the requirements for successful use.

This and other objects are accomplished by means of the arrangement disclosed by the accompanying sheets of drawings in which—

Figure 1 is a side elevation of a tractor cultivator embodying my invention;

Figure 2 is a top plan view of the same;

Figure 3 is a fragmentary side elevation of the same arrangement wherein one wheel and its driving mechanism are removed to show more clearly the cooperating parts;

Figure 4 is a top plan view of the tool carrying frame, some of the connecting parts being in section;

Figure 5 is a top plan view of the main wheel frames and the tool carrying frame illustrating the manner in which the tractor and tools are guided and controlled;

Figure 6 is a detailed sectional view taken in the plane of line 6—6 of Figure 4, illustrating the means by which the tool carrying frame is connected to the main wheeled frame; and Figure 7 is a detailed sectional view taken in the plane of line 7—7 of Figure 4 showing a loose connection between the tool carrying frame and an associated yoke.

The various novel features of the invention will be apparent from the following description and drawings and will be particularly pointed out in the appended claims.

Referring to the figures of the drawings, it will be noted that I have illustrated my invention in connection with a relatively light, hand-controlled garden tractor cultivator, including a main or dragging frame 10 supported by two ground engaging wheels 11, which are mounted at opposite ends of an axle 12. This main frame 10 carries an engine 13, which is adapted to propel the tractor through connections including chains 14, which transmit power to sprocket wheels 15 operatively connected to the ground engaging wheels 11. The main frame 10 includes side frame members 16 and 17, which are connected to rearwardly extending bars 18 which diverge rearwardly and are connected at their rear ends by a cross rod 19. One of these bars 18 is provided with a handle 20 by means of which the frame 10 may be turned. By thus applying pressure to the handle 20 in one direction or the other laterally of the machine, it will be understood that the ground engaging wheels 11 are caused to turn with the frame 10, thereby changing the direction of movement of the tractor. If the tractor is turned to the left, the main frame pivots about the left ground engaging wheel 11 at the point where the latter engages the ground, and if the tractor is turned to the right it pivots about the right hand ground engaging wheel 11 at the point where it engages the ground.

The tool carrying frame 21 is separate and distinct from the main frame 10 and includes two main side bars 22 to which, through brackets 23 and 24, ground working tools 25 and 26 respectively are attached. For illustrative purposes, the tools 25 are scrapers which cut weeds and when properly adjusted cut such weeds under ground at a proper depth, for example, one-half inch. The other tools 26 are cultivator shovels or mulchers. These main frame bars 22 are connected near their rear ends by a yoke 27, preferably, there being clearance spaces 28 (see Figure 7) between bosses 29 on the brackets 24 and the yoke 27 to give flexibility to the frame. Secured to the yoke 27 at its horizontal middle portion is a U-shaped strap 30, which receives a rod 31 extending between side frame members of the main frame for holding the latter in a balanced condition with respect to any oscillating movement about the axle 12 as an axis. Extending rearwardly from the main bars 22 of the tool carrying frame and forming a part of the latter are two bars 32 to which are connected gage wheels 33, which support the rear end of the tool carrying frame.

It will be noted that the front ends of the main side bars 22 of the wheel carrying frame 21 are flexibly connected to the front yoke member 34 connecting the side bar 17 of the main frame and that the side bars are unbending about a vertical axis from a region in advance of said main or dragging frame to the region of said tools. More specifically, (see Figure 6) the lower ends of the front yoke member 34 are provided with bosses 34ª which are received by relatively large openings 35 formed in the front ends of the side bars 22 of the wheel carrying frames. The diameter of the openings 35 is made considerably larger than the diameter of the bosses 34ª to give great flexibility and freedom of movement of the main wheel frame 10 with respect to the tool carrying frame 21. The side bars 22 are held in place on the bosses 34ª by any suitable means such as washers 36 and studs 37. By the construction illustrated and described the tool carrying frame 21 is connected to the power propelled frame in a manner to have swinging movement in a horizontal plane relative to said power propelled frame.

Particular attention is called to the fact that the tool carrying frame 21 is connected to the main wheeled frame at points in advance of the main ground engaging wheels 11 and more particularly in advance of the points where said wheels 11 engage the ground. As a result thereof, it will be noted, that when the main frame 10 is turned to the left for movement to the left, the tool carrying frame and the tools carried thereby immediately turn for movement to the left and if the main frame is turned for movement to the right, likewise, the tool carrying frame and the tools carried thereby are immediately turned for movement to the right.

Referring particularly to Figure 5 of the drawings, it will be noted that the main tractor frame 10 has been turned to the left for movement to the left and accordingly the main ground engaging wheels 11 also are turned to the left. As a result thereof the tool carrying frame 21 is turned to the left. From this arrangement it is seen that the tools 25 and 26 can be controlled with great accuracy. In other words, when the main tractor frame is turned to the left, the tool carrying frame turns to the left. Likewise, when the main frame of the tractor is turned to the right the tool carrying frame moves to the right. It should also be noted that by reason of the engagement of the rod 31 within the U-shaped strap 30, the tool carrying frame will be lifted when the power propelled frame is tilted forwardly, thereby facilitating the control of the machine when it is desired to turn same about, as, for instance, at the end of a row of vegetation.

For steadying the tool carrying frame the latter is provided with a handle 38 which extends rearwardly under the cross-bar 19 and over a second cross-bar 39 supported from the bars 18 by brackets 40. The hand controlled bar 38 is therefore retained in vertical position between the bars 19 and 39. The right hand is applied to this bar 38 for exerting just sufficient downward pressure to steady the tool carrying frame and preventing the latter from skidding to the right or left if there is any tendency so to do as a result of irregularities in soil conditions. While the handle 38 is held relatively stationary by the walking operator for steadying the tool carrying frame, the handle 20 is moved to the right or left by the operator for steering the tractor, or more particularly for directly steering the main tractor frame 10 and indirectly the tool carrying frame for giving the proper line of movement to the tools carried by said tool carrying frame.

It will be noted that the handle 20 is offset with respect to its associated frame to permit the walking operator to walk between the rows of vegetation and at the same time be arranged closely enough to the control bar 38 to permit easy handling of same.

By means of this arrangement the cooperative parts are accurately and easily controlled in a manner to prevent damage to rows of vegetation and in a manner to meet the requirements for practical cultivation work.

It is my intention to cover all modifications of the invention falling within the spirit and scope of the following claims.

I claim:

1. A ground working machine comprising in combination, a wheeled frame, a wheeled tool carrying frame connected to the wheeled frame in such manner as to be dragged thereby, the connection between the wheeled frame and tool frame consisting of a pair of laterally spaced substantially rigid members connected by spaced loose connections to the wheeled frame in advance of the wheel axis, said members being free to swing laterally relative to the wheeled frame.

2. A ground working machine comprising in combination, a wheeled tractor frame, a wheeled tool carrying frame connected to the wheeled frame in such manner as to be dragged thereby, the connection between the wheeled frame and tool frame consisting of substantially rigid members connected to the wheeled tractor frame in advance of the wheel axis, said members being free to swing laterally relative to the wheeled tractor frame, the tool frame wheels being guided in direction by the substantially rigid members, and means connecting the rear portion of the members and the wheeled tractor frame in such manner as to limit relative vertical movement between the wheeled tractor frame and members.

3. A ground working machine comprising in combination, a frame, traction means for said frame, tool carrying means mounted to be dragged by said frame, said tool carrying means including a substantially rigid member extending between the rear portion of said tool carrying means and a point in advance of said traction means on said tractor frame, a handle on the traction frame and an independent handle on the tool carrying means.

4. A ground working machine comprising in combination, a wheeled traction frame, a wheeled tool frame dragged behind the traction frame, laterally spaced connecting members extending forward from the tool frame and loosely connected at spaced points to the traction frame in advance of the wheel axis, a transverse bar carried by the rear portion of the traction frame, a yoke connecting the connecting members and a strap carried by the yoke and engaging the transverse bar.

5. A ground cultivating machine comprising a wheel supported tractor frame, a substantially rigid tool carrying member extending longitudinally of the machine and lying between the supporting wheels, a trailing loose connection connecting the front end of the tool carrying member to and supporting it in its operative position upon the tractor frame in front of the axis of the supporting wheels thereof, and a depth gauging ground engaging and guiding wheel supporting the rear end of the tool carrying member, said substantially rigid tool carrying member extending rearwardly from its connection with the tractor frame and between and to the rear of the supporting wheels.

6. A ground cultivating machine comprising a wheel supported tractor frame, a substantially rigid tool carrying member supported in its operative position at its front end by the tractor frame and at its rear end by ground engaging depth gauging and guiding means carried by the tool carrying member, and a draft connection between the front end of the tool carrying member and the tractor frame, said tool carrying member extending rearwardly between the wheels and to the rear thereof, said draft connection being located in front of the axis of the ground wheels and supporting the front end of the tool carrying member in its operative position and permitting horizontal swinging movements of the tool carrying member on said draft connection.

7. A ground working machine comprising an elevated wheel supported tractor frame, a trailing tool carrying frame located beneath the tractor frame and having its front end connected to the tractor frame in front of the ground wheels and supported on said tractor frame by a trailing connection, said tool carrying frame including spaced longitudinal frame members extending rearwardly between the ground wheels of the tractor frame and to the rear of said wheels, front and rear arches rigidly connecting said frame members, ground working tools carried by the tool frame members in rear of the wheels of the tractor frame, and ground engaging depth regulating and guiding wheels carried by the rear end portions of the tool frame members.

8. A ground working machine comprising an elevated wheel supported tractor frame, a trailing tool carrying frame located beneath the tractor frame and having its front end connected to the tractor frame in front of the ground wheels and supported on said tractor frame by a trailing connection, said tool carrying frame including spaced longitudinal frame members extending rearwardly between the ground wheels of the tractor frame and to the rear of said wheels, front and rear arches rigidly connecting said frame members, ground working tools carried by the tool frame members in rear of the wheels of the tractor frame, ground engaging depth regulating and guiding wheels carried by the rear end portions of the tool frame members, a horizontally slotted member carried by the rear arch with the slot extending longitudinally of the apparatus, and a cross bar on the tractor frame and extending loosely through the slot of the slotted member.

9. A ground cultivating machine, comprising in combination a frame, traction wheels for said frame, cultivating tool carrying means mounted to be dragged by said frame and between said traction wheels, said tool carrying means including a substantially rigid member extending from the rear portion of said tool carrying means to a point in advance of the axis of said traction wheels, and guiding means for the traction frame.

Signed at Chicago, Illinois, this 3rd day of September, 1921.

FORREST V. DONALD.